United States Patent [19]

Rajcevic et al.

[11] 4,006,010
[45] Feb. 1, 1977

[54] PRODUCTION OF BLISTER COPPER DIRECTLY FROM DEAD ROASTED-COPPER-IRON CONCENTRATES USING A SHALLOW BED REACTOR

[75] Inventors: Harold P. Rajcevic, Colonia; William R. Opie, Holmdel; Dominic C. Cusanelli, South Plainfield, all of N.J.

[73] Assignee: Amax Inc., New York, N.Y.

[22] Filed: May 30, 1975

[21] Appl. No.: 582,181

[52] U.S. Cl. .................................. 75/74; 75/72; 75/73
[51] Int. Cl.² .................................. C22B 15/00
[58] Field of Search ............... 75/74, 72, 76, 6, 7, 75/9, 73

[56] References Cited
UNITED STATES PATENTS

| | | | |
|---|---|---|---|
| 3,351,462 | 11/1967 | Arentzen et al. | 75/74 |
| 3,432,289 | 3/1969 | Spitz et al. | 75/76 |
| 3,669,646 | 6/1972 | Cullom | 75/74 |
| 3,799,764 | 3/1974 | Opie et al. | 75/72 |
| 3,844,765 | 10/1974 | Baum | 75/72 |
| 3,849,120 | 11/1974 | Norman | 75/74 |
| 3,857,701 | 12/1974 | Hunter et al. | 75/74 |

*Primary Examiner*—Walter R. Satterfield
*Attorney, Agent, or Firm*—Kasper T. Serijan; Eugene J. Kalil

[57] ABSTRACT

A method is provided for producing blister copper from calcined copper-iron sulfide concentrates wherein the calcine containing copper ferrite is mixed with particulate carbonaceous reducing agent and charged into a smelting furnace, slag-forming ingredients being also added to slag off iron oxide. The charge, in the form of a shallow bed, is smelted by applying heat whereby the temperature is raised to above the melting point of copper, the copper oxide being selectively reduced to form blister copper, the iron oxide being reduced to form substantial amounts of ferrous oxide, the iron oxide combining with $SiO_2$ present in the charge to form a slag and assure a low-iron copper product. Following reduction of the copper to molten blister copper, it is separated from the slag for further purification treatment, the slag being further treated when necessary to recover contained copper therefrom.

9 Claims, 5 Drawing Figures

PRODUCTION OF BLISTER COPPER DIRECTLY FROM DEAD ROASTED-COPPER-IRON CONCENTRATES USING A SHALLOW BED REACTOR

This invention relates to a substantially pollution-free method for the recovery of copper in the form of blister copper directly from calcined copper-iron sulfide concentrates. For the purpose of this invention, the term "copper-iron sulfide concentrate" is meant to include intermediate sulfur-containing products obtained by the flotation of sulfide minerals or by matte smelting, and the like.

STATE OF THE ART

The pyrometallurgical extraction of copper from copper sulfide is old in the art. One conventional method is to concentrate the copper sulfide ore, which also contains iron, by flotation in order to enrich the copper content thereof. The concentrate is partially roasted to remove a substantial amount of sulfur therefrom and the partially roasted concentrate mixed with unroasted concentrate and, with the addition of slag-forming ingredients, is then smelted in a reverberatory furnace to produce a copper-iron sulfide matte substantially enriched in copper.

The matte in the molten condition is transferred to a converter, for example, of the Peirce-Smith type, and the molten matte bottom blown through tuyeres with air to oxidize out the sulfur and the iron until white metal is produced (e.g., copper sulfide, $Cu_2S$). The slag formed during the blowing (the slag generally comprises silica and iron oxide formed by reaction during conversion) is poured from the converter and the white metal ($Cu_2S$) then blown to blister copper which is later fire refined, such as in an anode furnace, following which the partially refined copper is cast into anodes for subsequent electrolytic refining.

In recent years, the growing emphasis on environmental protection, particularly with respect to air pollution, is expected to have significant impact on conventional copper smelting methods due to the discharge of effluent $SO_2$ into the surrounding atmosphere. Attempts at reducing air pollution by converting all of the $SO_2$ generated in the smelting operation to sulfuric acid have not been attractive for economic reasons. For example, in the production of sulfuric acid by the contact absorption process, it is desirable for optimum efficiency that the effluent gas continuously contain at least 7 or 8% by volume $SO_2$. This is difficult in the foregoing process in that the concentration of effluent $SO_2$ produced by the converter varies considerably during processing, while the gaseous effluent from the reverberatory furnace is very low in $SO_2$ (usually 1 to 3.5%) which is not conducive economically to the production of sulfuric acid. Autogenous smelting of sulfide concentrates posed similar disadvantages.

A basic drawback in the foregoing methods of smelting sulfide concentrates is that matte smelting results in the emission of $SO_2$ at different concentrations at a number of points in the process stream. This applies to ordinary reverberatory smelting as well as to the recently improved flash smelting techniques practiced in Finland and Japan and also to electric matte smelting.

Further disadvantages of the foregoing methods are that the steps of going from the sulfide concentrate to the matte-forming stage and then through the converter to blister copper are rather time-consuming and add to the production cost of the final product.

Various alternative methods have been proposed for recovering copper from, for example, chalcopyrite, by circumventing matte smelting and the subsequent high temperature converting stages. In Schnabel's Handbook of Metallurgy (vol. 1, McMillan & Co., 1921, p. 21) a method is proposed for recovering copper from chalcopyrite in which the copper-iron sulfide is roasted to remove the sulfur to convert it to oxides of copper and iron. It is then stated that by smelting the oxides with carbon and silica, it would be possible to reduce the iron to the ferrous state and cause it to combine with silica to form a slag, while the copper oxide is selectively reduced to metal. However, the book then states that such a simple process would yield impure copper containing a substantial proportion of iron reduced with the copper and including injurious amounts of metal impurities, such as arsenic and antimony, with substantial amounts of copper lost in the slag. The disadvantages of this method are quite apparent and need not be discussed further.

In German patent No. 855,770 Nov. 17, 1952), assigned to Metallgesellschaft A.G.) a method is disclosed for smelting copper sulfide concentrate directly to blistergrade copper by the steps of (1) calcining the concentrate to a residual sulfur content ranging up to 5%, (2) adding slag formers and a controlled amount of carbon to the calcine, and (3) smelting the charge in a submerged-arc electric furnace. An important aspect of the process resides in controlling the carbon content of the charge and adjusting and retaining sufficient sulfur in the charge to form a thin intermediate matte layer between the molten copper and the slag to inhibit loss of copper into the slag.

Thus, summarizing the foregoing, the various alternative proposals either resulted in substantial reduction of iron which combined with the copper to form black copper which had to be reprocessed and/or considerable loss of copper in the slag.

OBJECTS OF THE INVENTION

It is thus the object of the present invention to provide a substantially pollution-free method for producing blister copper low in iron from copper-iron sulfide material by first roasting said material to convert the copper-iron sulfide to a stable copper ferrite and remove substantially the sulfur for the subsequent recovery thereof and thereby avoid emission of substantial amounts thereof in subsequent processing steps.

Another object of the invention is to provide a pyrometallurgical smelting method of producing blister copper low in iron from calcined copper-iron sulfide concentrate.

These and other objects will more clearly appear when taken in conjunction with the following disclosure and the accompanying drawing, wherein.

STATEMENT OF THE INVENTION

Figure 1:
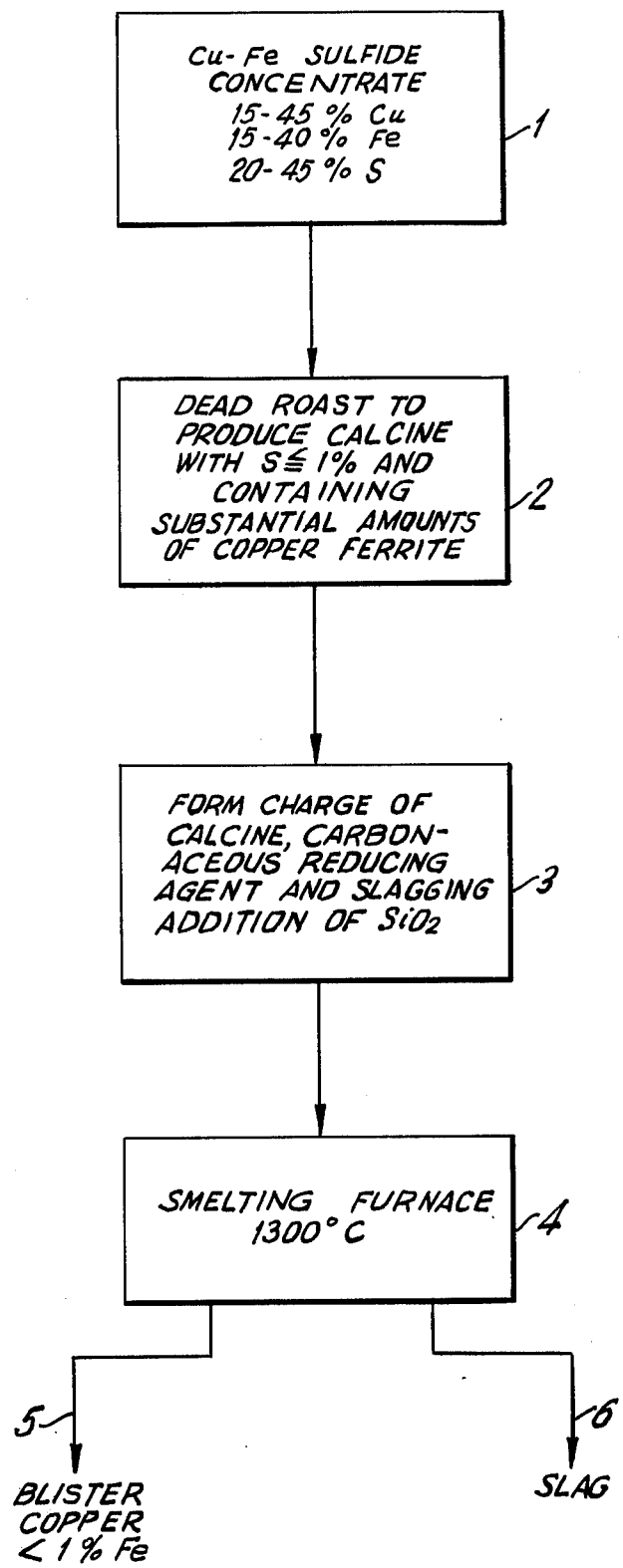
FIG. 1 is a flow sheet depicting one embodiment for carrying out the invention.

Our invention resides in the fact that we can selectively reduce copper from copper-iron oxide calcine to form blister copper while substantially inhibiting iron oxide from being reduced and combining with the copper. According to the prior art discussed hereinbefore, the smelting of calcine containing both iron and copper was discouraged because a substantial proportion of the iron would tend to be reduced with the copper and also a large amount of copper would be lost in the slag.

We have found that we can overcome the foregoing problem by employing our novel method for producing blister copper from copper-iron sulfide concentrate containing by weight about 15 to 45% Cu, about 15 to 40% Fe, about 20 to 45% S, the total Cu, Fe and S content being at least about 85% and the balance gangue and residual metals. The method comprises dead roasting said concentrate at a temperature above 850° C to remove substantially the sulfur therefrom, preferably below about 1%, and form a calcine containing ferric iron oxide as evidenced by the formation of substantial amounts of copper ferrite. It is known that the roasted concentrate may also contain magnetite. Thus, it is to be understood that the term "copper ferrite" employed in the disclosure and in the claims is not meant to exclude the presence of magnetite.

Preferably, the sulfide concentrate is roasted at a temperature short of the sintering thereof and which does not defluidize the bed. A shallow bed charge is formed in a smelting furnace in which the calcine is mixed with a fluxing agent comprising $SiO_2$ to slag off iron oxide in said concentrate when it is reduced to FeO, the charge including an amount of carbonaceous material sufficient to reduce copper oxide in the calcine to copper and ferric iron oxide to FeO. The amount of $SiO_2$ should be at least sufficient to sequester iron oxide, especially ferrous oxide (FeO), as it is reduced from the higher valence state in the copper ferrite, and provide a slag having a melting point below 1250° C. Preferably, the slag is one in which the ratio by weight of total Fe to $SiO_2$ ranges from about 1.2:1 to 4:1 and preferably about 1.25:1 to 2.3:1 The shallow bed charge is then smelted by raising the temperature thereof in excess of the melting point of copper, whereby copper oxide is selectively reduced to copper and the iron oxide substantially to ferrous oxide, the iron oxide combining with silica and forming a molten slag during the formation of molten blister copper. The molten blister copper which is separated from the slag for further metallurgical treatment generally assays at least about 97% Cu and contains less than about 1% S and less than about 1% Fe.

It is preferred in carrying out the foregoing process that the sulfide concentrate be dead roasted to a sulfur content not exceeding about 1%. The roasting is carried out at an elevated temperature conducive to the formation of ferric iron oxide as evidenced by the formation of substantial amounts of copper ferrite after removal of the sulfur, for example, at a temperature in excess of 800° C, such as 850° C to 950° C, but below the temperature at which sintering occurs. By controlling the air-to-concentrate ratio, a fairly enriched effluent gas is obtained containing at least about 7 to 8% $SO_2$ useful in the preparation of sulfuric acid or elemental sulfur. Dead roasting at 880° C to remove substantially sulfur therefrom provides a calcine which is substantially wholly magnetic as evidenced by complete transfer of the calcine to a magnet, thus indicating the substantial formation of copper ferrite.

It is important during roasting to minimize the formation of stable metal sulfates, to promote the oxidation of iron in the concentrate to its highest state of oxidation and form copper ferrite. Such impurities as arsenic, bismuth and antimony are in part removed as a fume during roasting and in part taken up in the ferrite and follow the iron into slag. Fluid bed roasting is ideally suited towards achieving the foregoing objectives. The provision of a calcine containing substantial amounts of copper ferrite ($CuO \cdot Fe_2O_3$ or $CuFe_2O_4$) is one aspect of this invention that makes possible the subsequent production of low-iron blister copper when the roasted calcine is rapidly smelted with suitable fluxes and a carbonaceous reducing agent in a smelting furnace such as in a shallow bed reactor similar to a shortshaft blast furnace or in an oxy-fuel fired rotary furnace. The rotary furnace functions as a shallow bed furnace by virtue of the fact that the charge is caused to cascade during smelting and, like the blast furnace type referred to hereinabove, provides rapid smelting of the copper oxide while minimizing the contact of ferrous iron oxide with the reducing conditions that obtain in the furnace.

The new and improved results obtained with the novel inventive concept are apparently attributable to the difference in the thermodynamics and kinetics of reaction involved in the reduction of the CuO component of the ferrite compound compared with the $Fe_2O_3$ component. The ferrite compound itself is more refractory than a simple mixture of CuO and $Fe_2O_3$. Thus, when subjecting the ferrite to the reducing action of CO resulting from the controlled oxidation of the carbonaceous fuel, the CuO component is selectively reduced before the iron oxide component has had time to react completely with the CO to produce metallic iron.

When carrying out the reaction at above the melting point of copper, the selective nature of the reaction is believed to pass through several stages as follows:

$$2 CuO + C \rightarrow 2 Cu° + CO_2 \qquad (1)$$

wherein the copper oxide component of the ferrite compound is selectively reduced to copper, while the ferric iron oxide component is being reduced to ferrous oxide as follows:

$$Fe_2O_3 + CO \rightarrow 2FeO + CO_2 \qquad (2)$$

with the reduction of CuO to copper being quite rapid. By having a flux comprising silica ($SiO_2$) present at this point, the ferrous oxide formed is substantially immediately sequestered by the silica to form a ferrous silicate slag which inhibits the further reduction of FeO to Fe as follows:

$$FeO + CO \rightarrow Fe° + CO_2 \qquad (3)$$

The faster rate of reaction (1) compared to the effectively slower combined rates of reactions (2) and (3) is advantageously utilized in a rapid smelting step to produce a high-grade blister copper, especially by having silica present to slag off substantially the FeO as it is formed, including a lesser amount of unreduced ferric oxide remaining following rapid smelting. In this connection, a shallow bed is important to assure a short residence time of the charge during the smelting step, whether by employing a cascading bed (rotary furnace) or a relatively static bed of the type similar to that present in a short-shaft blast furnace.

The minimum $CO/CO_2$ ratio for reducing the copper is lower than the minimum $CO/CO_2$ ratio for the eventual reduction of FeO to Fe. It is also believed that as long as some ferric oxide remains, the reduction of iron oxide to metallic iron is inhibited. We do not wish to be held to the foregoing theory but, whatever the theory, we have observed that we can carry out the selective reduction reaction fairly rapidly by employing short residence times in the furnace and produce a low-iron blister copper before the iron oxide has a chance to be reduced. The difference in the kinetics between the reaction to reduce the copper oxide to copper and the reaction to reduce the iron oxide to iron enables the smelting to be carried out at substantially reduced resisdence times, so long as the temperature of the reaction is above the melting point of copper, for example, substantially in excess of 1100° C, and preferably ranging from about 1200° C to 1375° C, e.g. about 1250° C.

The control of the sulfur in the calcine to no more than 1% or less is preferred in that (1) it avoids any further significant sulfur removal during the reduction treatment of the calcine, (2) it prevents the formation of matte during smelting which would otherwise require conversion, and (3) the presence of more than 1% sulfur adversely affects the amount of recoverable copper as blister from the calcine because of matte formation.

A typical flow sheet for carrying out one embodiment of the invention is depicted in FIG. 1 which shows copper-iron sulfide concentrate 1 dead roasted at 2 to produce a calcine containing not more than 1% by weight of sulfur and also containing a substantial amount of copper ferrite. A charge 3 is formed of the calcine mixed with a carbonaceous reducing agent (e.g. metallurgical coke) and a slagging addition of silica and the mix smelted continuously in furnace 4 at about 1300° C (e.g. a shallow bed reactor furnace), the charge being added to such a furnace at a rate of about 550 lbs/sq. ft. of hearth area/hr. to an incandescent coke bed, after which the selective reduction and melting of the copper to blister copper occurs as the temperaure of the charge rises from its temperaure at the time of charging to the operating smelting temperature over a relatively short time period, such as less than 1 hour and even as low as 30 minutes or less, to produce blister copper 5 containing, for example, less than 1% iron (preferably less than 0.5% iron) and a slag 6 containing the iron oxide (FeO) combined with silica as a silicate. The slag generally comprises FeO and $SiO_2$ as the main ingredients, and preferably, an effective amount of ferric oxide, and usually will also contain any gangue material which may be present in the concentrate, such as aluminum oxide, calcium oxide, magnesium oxide with the $Fe/SiO_2$ ratio as stated hereinbefore.

Thus, summarizing the foregoing, the charge is maintained in the furnace from its time of entry for a residence time sufficient to raise the temperature of the charge to an operating smelting temperature in excess of the melting point of copper to reduce the copper oxide to metallic copper and melt it and reduce substantial amounts of ferric oxide to ferrous oxide, the iron oxide combining with $SiO_2$ present to form a molten slag and thereby provide blister copper containing less than about 1% iron by weight.

Figure 3:
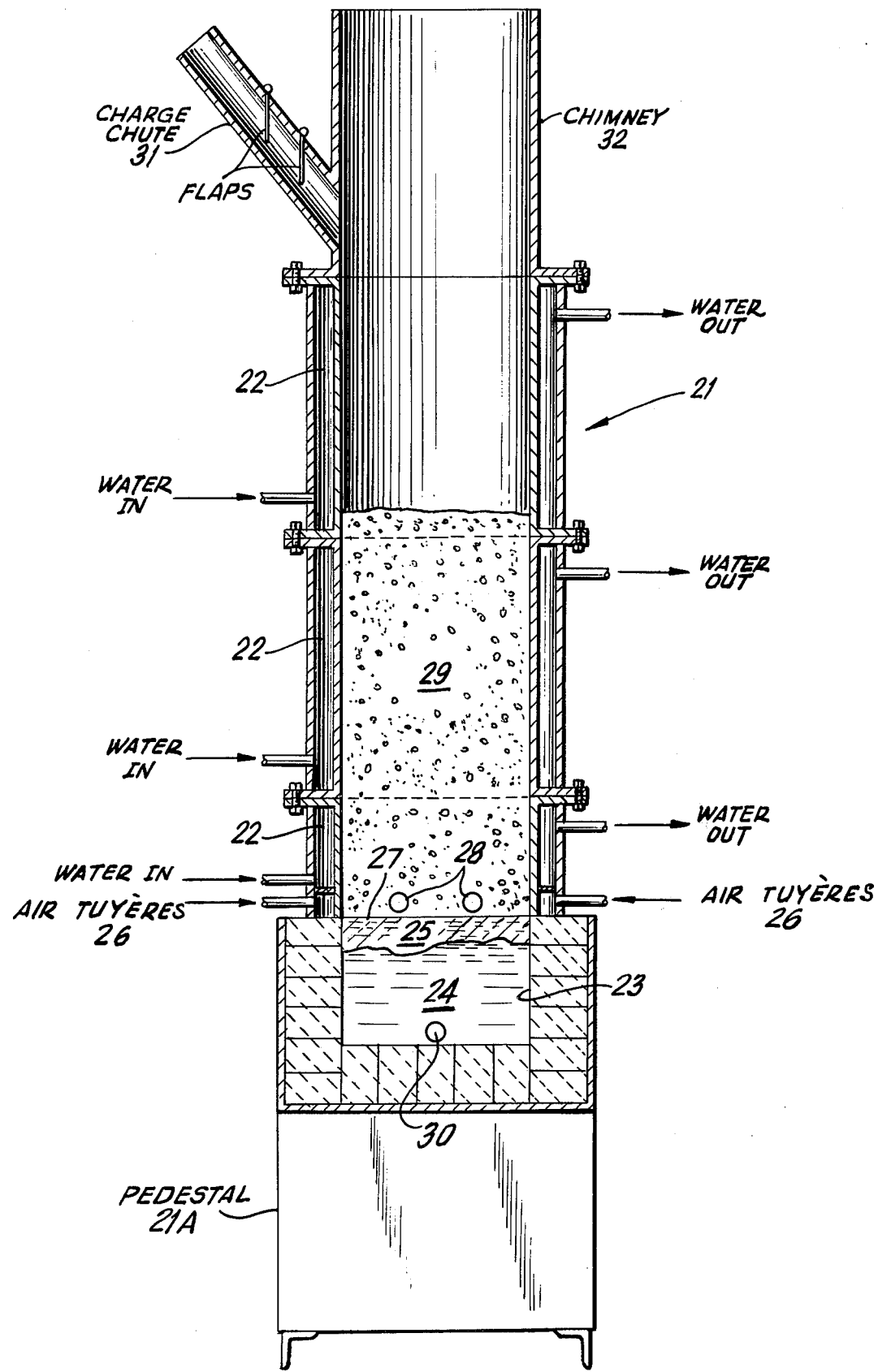
FIG. 3 is a cross section of a shallow bed reactor type of smelting furnace for carrying out one embodiment of the invention.

A typical shallow bed reactor is shown in FIG. 3 and is to be described later. The foregoing reactor is similar to a blast furnace but, unlike the typical blast furnace, uses a shallow bed which may range up to about 6 feet in depth, for example, 1 to 4 feet, the shallow bed being important to assure rapid smelting of copper oxide to blister copper low in iron and to inhibit the solid state reduction of iron oxides to iron by carbon monoxide as occurs in the deep column of the conventional iron blast furnace for reducing iron ore to pig iron which is many feet high. In the book *Modern Steels* (published by The American Society for Metals, 1939), an iron blast furnace is described on page 11 with a height of 95 feet and a stack length above the hearth for holding the charge of about 60 feet. Such a furnace would not be suitable for carrying out the present invention in that the residence time in the stack would be too long and would tend to promote high iron blister copper, which is not desirable, by virtue of CO rising through the long column and reducing the iron oxide to metallic iron.

Figure 4:
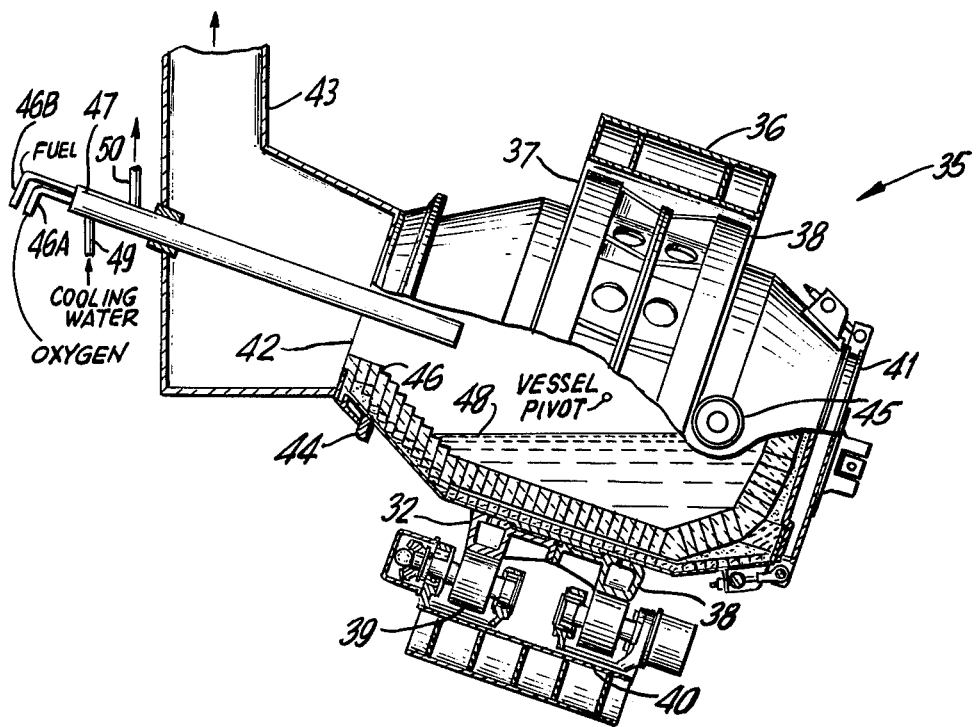
FIG. 4 is illustrative of another type of smelting furnace (a tiltable rotary furnace) partially broken away and tilted at a slight angle to the horizontal for carrying out the invention.

The rotary furnace shown in FIG. 4 operates in a sense as a shallow bed reactor in light of the fact that the charge cascades during reduction to provide, similarly, a low-iron blister copper product.

An optional feature of the invention is that maximum advantage can be taken of the heat generated by the combustion of the sulfur in the initial dead roasting step as follows:

1. By conserving the sensible heat of the calcine after roasting through the use of insulated storage and feed hoppers. Thus, hot calcine is provided for the next treatment step. This is an energy conservation step which can be included as part of any of the subsequent methods for treating the calcine.
2. By using the hot off-gases from the roasters to preheat the blast air or oxygen supplied to a furnace in which dead-roasted calcines are smelted to generate steam for operating ancillary equipment directly or to generate electricity.

Figure 2:
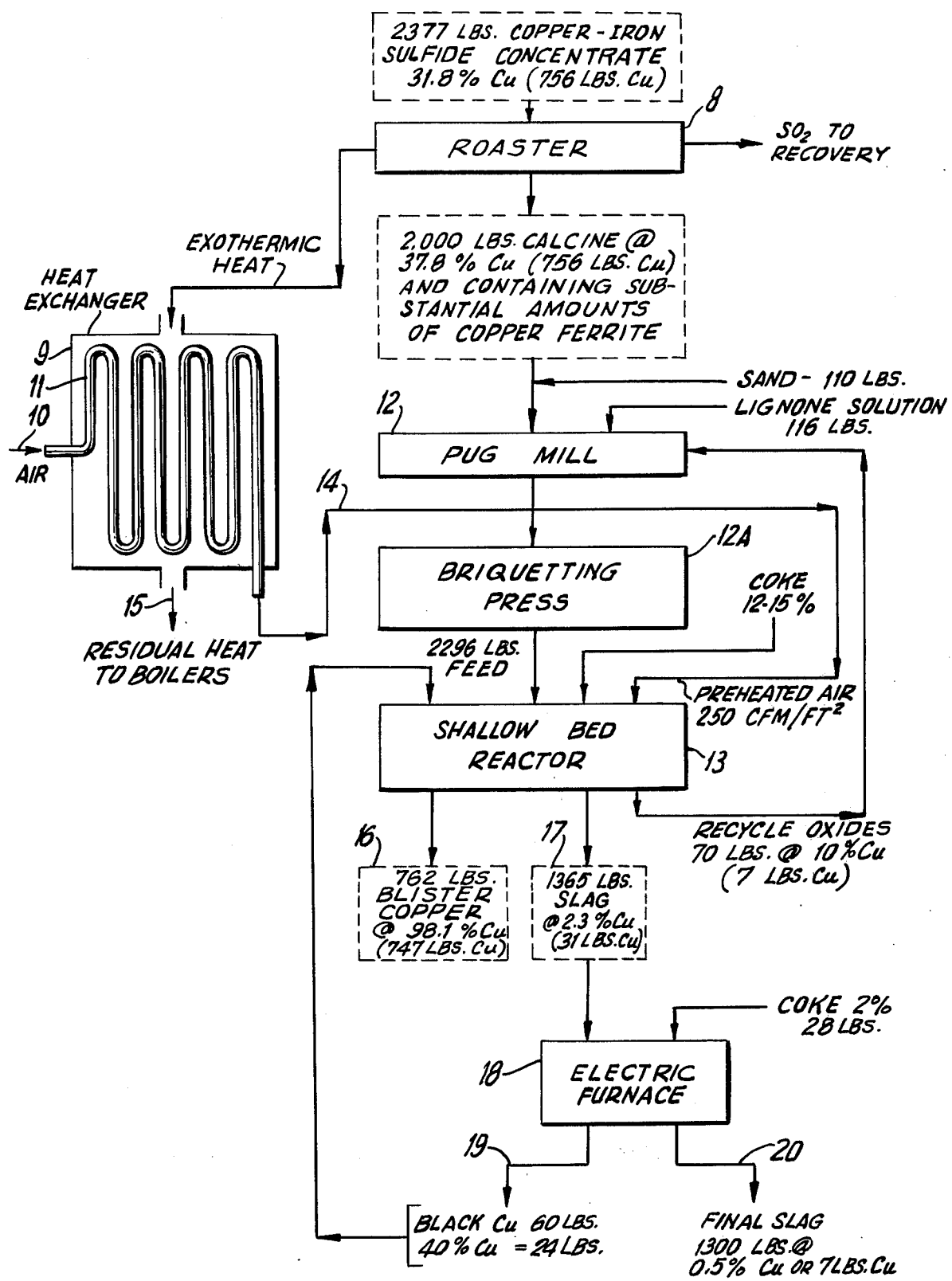
FIG. 2 is a flow sheet illustrating another embodiment of the invention.

The foregoing optional features together with additional features of the invention are depicted in the flow sheet of FIG. 2 in the treatment of a copper-iron sulfide concentrate which is calcined in roaster 8 as described for FIG. 1 with the $SO_2$ going to recovery and the exothermic heat passed through heat exchanger 9 for preheating air 10 conducted via heat exchanger tubes 11 in the heat exchanger. The calcine is mixed in pug mill 12 with a slagging addition of sand ($SiO_2$), a suitable binder, such as a lignone solution, and the mixture briquetted in press 12A and the briquettes charged into shallow bed reactor 13 together with approximately 12 to 15% by weight of coarse coke, e.g., 1 inch to 3 inches coke, preheated air 14 emanating from heat exchanger 9 being supplied to the reactor at 250 $CFM/ft^2$ of hearth area, the residual heat 15 of the heat exchanger going to boilers to generate steam.

Low-iron blister copper 16 (762 lbs. at 98.1% copper) is produced in reactor 13. The resulting slag (1365 lbs.) which contains 2.3% copper is charged into electric furnace 18 together with carbon where the copper in the slag together with some iron is reduced to black copper 19, the cleaned slag 20 being sent to dump. The black copper 19 is recycled to smelting reactor 13 from which it is recovered as blister copper. By recycling the black copper to the smelting furnace, total overall recoveries of copper of over 98 or 99% can be achieved. Another method of recovering the copper from the slag is by known flotation techniques.

DETAILS OF THE INVENTION

As illustrative of the various embodiments of the invention, the following examples are given.

EXAMPLE 1 - SHALLOW BED REACTOR

Blister copper relatively low in iron is produced starting with a copper-iron sulfide concentrate (I) having the following analysis:

| Element | I |
|---|---|
| Cu | 31.8% |
| Fe | 25.4% |
| S | 34.7% |
| $SiO_2$ | 6.1% |
| $Al_2O_3$ | 1.4% |
| Residuals | bal. |

The foregoing constituents make up 99.5% of the total composition with residuals comprising about 0.5%. The copper, iron and sulfur content is 92% of the total composition.

The foregoing concentrate was roasted at a temperature of about 880° C in the presence of air to reduce the sulfur to a level below about 1% by weight and assure the conversion of the iron present to ferric oxide and subsequently the formation of substantial amounts of copper ferrite ($CuO.Fe_2O_3$ or $CuFe_2O_4$). The resulting calcine calculated to the following approximate composition:

| % CuO | 48.0 |
|---|---|
| % $Fe_2O_3$ | 42.2 |
| % $SiO_2$ | 7.4 |
| % $Al_2O_3$ | 1.7 |
| % Residuals | 0.7 |
| | 100.0 |

The $Fe_2O_3$ content of 42.2% corresponds to 38 parts by weight of FeO, assuming complete reduction.

In producing a charge from the foregoing calcine, a mix is prepared for agglomeration by blending the calcine with a predetermined amount of silica sand, some lignone binder and water in approximately the following proportions:

| Agglomerate Mix | |
|---|---|
| Calcine | 1000.0 lbs. |
| Sand ($SiO_2$) | 50.0 lbs. |
| Lignone Solution* | 50.0 lbs. |
| Recycled Baghouse Collect (10% Cu)** [Optional] | 50.0 lbs. |
| TOTAL | 1150.0 lbs. |

\* *This solution is a calcium ligno-sulfonate liquor containing 50% water
\*\*Oxidic flue dust containing 10% Cu and such residuals as one or more of Pb, Zn, Sn, Bi, Sb, etc.

The ingredients were thoroughly mixed in a pug mill and then agglomerated by either pelletizing or briquetting. In this instance, the agglomerate comprised a briquette which was pillow-shaped and had an approximate size of 11/16 × 9/16 × 3/8 inch as produced by a Komarek-Greaves briquette press. The briquettes were either used as such or after air drying.

The briquettes were smelted at a predetermined feed rate in a shallow bed reactor of the type depicted in FIG. 3. The reactor had a diameter of 19 inches which provided an area of about 1.97 sq.ft. The briquettes were charged as a mixture with metallurgical coke, the amount of coke being approximately 18% by weight of the briquette charge, the smelting being started with an incandescent bed of coke. The air blast was applied through the tuyeres at a rate corresponding to 250 CFM ft.$^2$ of hearth area.

The shallow bed reactor shown in FIG. 3 comprises an upstanding cylindrical shaft furnace 21 of steel made up of flanged sections with water jackets 22 water cooled as shown, a lower portion of the furnace having a brick-lined melt-receiving hearth 23 for holding blister copper 24 and an overlying slag layer 25 supported by pedestal 21A of the furnace, a tuyere system 26 surrounding the furnace above slag line 27, the tuyeres communicating with air ports 28 for feeding air or oxygen-enriched air under pressure into charge bed 29. During smelting, the charge bed moves downwardly as copper is reduced and melted and slag forms, while additional material is charged from the top.

The furnace is first preheated by charging it with coke which is combusted and heat developed by blowing air to the bed through said tuyeres at the aforementioned rate.

The molten blister copper accumulates at the bottom of hearth 23 as shown, from which the molten copper and slag are tapped at intervals via tap hole 30. As blister copper forms and settles into hearth 23, additional material is charged via charge chute 31, flaps being provided as shown to prevent combustion products from backing up the charge chute. The effluent gases are removed via chimney 32. It is important that a shallow charge bed be used as shown so that the charge can be heated quickly and the copper reduced during a relatively short residence time of the charge in the reactor to take advantage of the differences in the kinetics of the reaction in which ferric oxide is reduced to FeO at a slower rate than the reduction of CuO to metallic copper, thereby assuring low-iron blister copper.

A charge bed of about 40 inches deep (3.33 feet) was found adequate for the shallow bed reactor shown in FIG. 3 having an inside diameter of 19 inches, and a height from the top of the hearth to the bottom of the chimney of about 60 inches (5 feet).

The feed rate of the charge through the smelting furnace was calculated at 550 lbs./ft$^2$ of hearth area/hour to provide a total feed rate through the furnace ranging from about 1000 to 1200 lbs. per hour. The smelting temperature ranged from about 1250° C to 1350° C. The temperature may be as high as 1400° C.

The results obtained in a series of five tests are given as follows:

Table 1

| Test No. | Blister Product % | | | | Slag Product % | | | | | Cu Distribution % | |
|---|---|---|---|---|---|---|---|---|---|---|---|
| | Cu | Fe | Ni | S | Cu | Total Fe | $Fe^{++}$ | $Fe^{+++}$ | $SiO_2$ | In Blister | In Slag |
| 1 | 97.7 | 0.61 | 0.04 | 0.66 | 1.26 | 40.8 | 35.8 | 5.0 | 32.9 | 98.0 | 2.0 |

Table 1 -continued

| Test No. | Blister Product % | | | | Slag Product % | | | | Cu Distribution % | |
|---|---|---|---|---|---|---|---|---|---|---|
| | Cu | Fe | Ni | S | Cu | Total Fe | $Fe^{++}$ | $Fe^{+++}$ | $SiO_2$ | In Blister | In Slag |
| 2 | 97.9 | 0.50 | — | 0.70 | 4.20 | 48.9 | 46.0 | 2.9 | 19.7 | 94.0 | 6.0 |
| 3 | 97.6 | 0.45 | — | 0.72 | 2.10 | 43.1 | 35.8 | 7.3 | 28.1 | 96.9 | 3.1 |
| 4 | 97.0 | 0.11 | 1.40 | 0.60 | 1.52 | 43.2 | 37.4 | 5.8 | 27.7 | 97.8 | 2.2 |
| 5 | 99.4 | 0.03 | — | 0.24 | 3.4 | 41.9 | 25.5 | 16.1 | 26.1 | 95.1 | 4.9 |

As will be noted, the blister copper assays at least 97% copper, with the iron content below 1%. In Test No. 1, 98% of the total copper reported in the blister, with Test No. 2 showing the lowest distribution. However, this can be minimized by recovering the copper from the slag as black copper and then recycling it into the process, for example, as in Test No. 4 wherein such recycle was effected. As will also be noted, the ratios of Total Fe to $SiO_2$ in the slag for Tests 1 through 5 calculated to 1.24:1, 2.46:1, 1.53:1, 1.56:1 and 1.6:1, respectively, the five slags combined averaging out to approximately 1.7:1 ratio, the foregoing slags being characterized by melting points below about 1250° C. As will be appreciated, the slags may generally contain small amounts of alumina ($Al_2O_3$) and lime (CaO) which do not raise the melting point to any great extent and which generally tend to lower the melting point of the slag.

It has been observed that in rapidly smelting the charge in accordance with the invention, not all of the ferric oxide is reduced to FeO for combining with the $SiO_2$ present. This is supported by the results in Table 1 wherein the analyses of the iron silicate slags showed the presence of significant amounts of iron in the ferric state ranging from about 2.9 to 16.1%, apparently as ferric oxide. Since not all of the ferric oxide was reduced to FeO during the short residence time of the charge in the furnace, it follows that essentially very little or no iron oxide would be reduced to metallic iron as evidenced by the fact that the blister copper produced in all the tests contained less than 1% iron. Thus, the desirable rate of rapid smelting is that rate which favors the incomplete reduction of ferric oxide to FeO so long as sufficient FeO is produced to provide a fluid slag with $SiO_2$ and provides a residence time in the furnace which is long enough to effect substantially complete reduction of CuO to Cu. Thus, the slag produced in accordance with the invention may contain ferric iron in the oxidized state in amounts ranging up to about 20% by weight, for example, about 1 to 20%.

As stated hereinbefore, by taking advantage of the relative kinetics of the reaction as between the reduction of CuO to metallic copper and ferric iron oxide to FeO, the charges can be rapidly smelted to produce low-iron blister copper as an end product, with the iron less than 1%. As will be noted, the blister copper produced in Test No. 5 exhibited a very low iron content of 0.03%.

Two additional tests were made in which a small amount of lime was present in the slag. The results of these tests which were run at a feed rate of 900 to 1000 lbs. per hour using substantially the same briquette charge as hereinabove are as follows:

TABLE 2

| Test No. | Blister Product % | | | Slag Product % | | | | Cu Distribution % | |
|---|---|---|---|---|---|---|---|---|---|
| | Cu | Fe | S | Cu | Total Fe | $SiO_2$ | CaO | In Blister | In Slag |
| 6 | 98.2 | 0.44 | 0.70 | 1.53 | 45.0 | 26.3 | 2.5 | 98.2 | 1.8 |
| 7 | 98.2 | 0.11 | 0.75 | 2.10 | 45.5 | 25.1 | 2.3 | 96.2 | 3.8 |

In these two tests, the blister copper assays at least 98.2% with the iron content below 0.5%. As will be noted, over 96% of the total copper reported in the blister product. The ratios of Fe to $SiO_2$ for Tests 4 and 5 were 1.78:1 and 1.8:1, respectively, the foregoing slags similarly being characterized by a melting point of below 1250° C, e.g. 1200° C or less.

These tests confirm the object of the invention of producing low-iron blister copper. The foregoing results are achieved through the use of a shallow bed reactor which enables rapid smelting of the charge over a time period during which iron oxide is inhibited from being reduced to metallic iron and thus from entering the blister copper. The use of a shallow bed enables smelting times of less than one hour which is a fairly rapid smelting cycle.

The residence time of a typical charge is determined as follows, based on the foregoing tests. The 19 inch diameter shallow bed reactor has a hearth area of 1.97 square feet. The depth of the working charge in the furnace in this instance is about 40 inches or 3.33 feet (above the tuyeres). The briquettes which comprise a mixture of calcine and flux have a density of about 100 lbs. per cubic foot. On this basis, the total volume of the charge is equal to 3.33 × 1.97 or 6.56 cu.ft.

In a fully made up charge including the coke, the briquettes constitute about 64% of the furnace charge by volume. With the total volume of the charge column equal to 6.56 cu.ft., the residence time of the briquettes in the column is calculated as follows:

Volume occupied by briquettes is 6.56 × 0.64 equals 4.2 cu.ft. of briquettes, with the density of the briquettes equalling 100 lbs./ cu.ft.

The weight of briquettes in the charge column is 4.2 × 100 lbs. which equals 420 lbs.

Thus, a feed rate of 1000 lbs/hr briquette through the reactor provides an average residence time of the briquettes in the column of about 420/1000 which is equal to 0.42 hr. or 25 minutes.

Assuming a charge column above the tuyeres of 6 feet in length and a charge throughput of 1000 lbs/hr., the residence time of the charge is determined as follows:

The volume of column A is equal to 1.97 × 6 or 11.82 cu.ft. Partial volume occupied by the briquettes is 11.82 × 0.64 which is equal to 7.6 cu.ft. which calculates to a weight of 7.6 × 100 (density of briquettes) or 760 lbs. briquettes in the column. At a feed rate of 1000 lbs/hr of briquettes through the reactor, the residence time becomes 760/1000 which is equal to 0.76 hour or 45.5 minutes.

At a feed rate of 1300 lbs. of briquettes per hour, the total residence time in the column would be about 760/1300 or 0.585 hour (35 minutes).

In each of Test Nos. 1 to 7, the residence time of the charge in the furnace was less than one hour and generally ranged from about 15 minutes to 30 minutes for a charge column of about 40 inches in height.

Since the slags from the foregoing tests also contain recoverable copper, these slags can be further treated by slag cleaning in an electric arc furnace with about 1.5% by weight of metallurgical coke. The amount of coke may range from 1 to 5% by weight of slag. The cleaning of the slag at about 1300° C results in the formation of black copper assaying about 40% Cu and 60% iron which is recycled to the smelting furnace. The temperature during slag reduction may range from about 1200° C to 1350° C. The black copper may be recycled to the blast furnace in the form of ¼ inches to 1 inch shot along with about 5% of its weight in additional silica to slag the iron content of the black copper.

Alternatively, the additional copper value in the slag may be recovered by flotation. This procedure is especially advantageous in the instances where a substantial amount of the copper is present in the slag in finely divided metallic state. The host slag is first ground to pass a 60 mesh screen and is then subjected to flotation in an acid pulp at a pH of about 4, using a frother reagent such as Cyanamide 194. The copper product obtained by flotation contains much less iron than the copper product obtained by electric slag cleaning. Consequently, it is readily recyclable to the smelting furnace or, if desired, further refined in a separate furnace.

While the operation of the shallow bed smelting furnace described hereinbefore uses coke in the proportion of about 18% by weight of the agglomerated charge, this amount of coke can be substantially reduced in the following circumstances:

1. By using a large furnace;
2. If the blast furnace is charged with hot briquettes to take advantage of the sensible heat in the calcine generated during roasting of the copper-iron sulfide concentrate;
3. If the blast air is preheated to about 200°-300° C before it is injected into the tuyeres of the furnace; and
4. By enriching the blast air with oxygen.

For the most successful and economical operation of the blast furnace in smelting, for example, calcined chalcopyrite concentrate, the amount of coke used should not exceed that necessary to cause reduction of the copper oxide and generate heat for melting the reduced copper and for melting the slag. Excessive use of coke, besides being uneconomical, tends to promote the reduction of iron and should be avoided lest a substantially degraded blister copper is obtained, i.e. with a copper assay below 96% Cu by weight. By feeding a hot charge to the furnace, or using pre-heated air, or both, the coke requirements are minimized to that amount needed for the reduction of copper oxide. Broadly, the amount of coke may range from about 8 to 25% by weight of the briquettes, preferably about 12 to 18%.

ROTARY FURNACE SMELTING

The rotary furnace is another illustration of a shallow bed smelting furnace. Tests have indicated that a good grade of blister copper low in iron is obtainable by smelting a charge of dead roasted calcine mixed with controlled amounts of carbonaceous material (e.g., metallurgical coke) and suitable fluxes in a tiltable rotary furnace in which the charge is caused to cascade and thereby behave as a shallow bed, the furnace being adapted to be operated with a controlled atmosphere.

The use of tiltable rotary furnaces has gained wide acceptance in the last few years in the steel industry, although much less so in non-ferrous smelting. One of the advantages of the rotary furnace is its excellent thermal efficiency, especially when the fuel is combusted with pure oxygen, and the speed with which high temperatures are obtainable in the furnace by such use. In addition, the use of oxygen decreases the volume of exhaust gases by as much as 75% because of the elimination of nitrogen to form effluent gases of lower velocity and consequently reduced dust loading.

The replacement of air with oxygen has been particularly useful in rotary furnaces for smelting and converting metalliferous charges. The technique was applied to steel in Sweden in 1957. The process was later adopted for the conversion of nickel sulfide to metallic nickel.

One method which has been proposed to treat copper sulfide concentrates or mattes directly comprises using a device similar to the foregoing, referred to in the art as a "top blown rotary converter". The device is disposed horizontally and is capable of being tilted or inclined upwards of 15° or 20° to provide optimum balance between degree of fill and agitation (note FIG. 4).

The foregoing device using a mixture of oxygen and natural gas has been found successful in the treatment of black copper, which is a highly impure form of copper containing iron, zinc, lead and other metallic impurities. In U.S. Pat. No. 3,432,289, for example, a method is described for oxidative refining of black copper in which the black copper is charged into a horizontal rotary furnace and the charge subjected to a torch of oxygen and a hydrocarbon gas (e.g. methane) introduced by means of a tubular concentric burner as the furnace is rotating. The flame resulting from the combustion of the hydrocarbon gas supplies sufficient heat to maintain the impure copper in the molten condition, the atmosphere being controlled so as to be oxidizing to the copper. As the furnace or converter is rotating, a film of copper adheres to the sides of the furnace and is oxidized by the oxygen in the atmosphere, such that when the oxidized film is submerged in the bath during rotation, oxygen exchange occurs with the impurities within the bath which are oxidized, the oxidized impurities entering the overlying slag and the reduced copper entering the molten bath. This purification continues until substantially all of the impurities in the black copper have been removed with blister copper remaining as the product.

The black copper treated in the foregoing patent contains, in addition to Sn, Pb, Zn, Ni, S and Si, about 5.85% Fe. Calcined copper-iron sulfide concentrates or mattes generally contain much higher amounts of iron which presents the problem of producing blister copper low in iron.

As far as we are aware, an oxy-fuel fired rotary furnace has not been used successfully in the reduction smelting of copper-iron calcine produced from a high grade copper-iron sulfide concentrate to produce low-iron blister copper. Because of the high temperature obtainable with this method of smelting, there is a tendency for the iron to reduce and enter and degrade integral blister copper formed. However, we have found that we can minimize this effect by using dead roasted calcine in which the iron is in its highest oxidized state (ferric iron oxide) as evidenced by the presence of substantial amounts of copper ferrite.

A typical rotary smelting furnace suitable for the practice of this invention is illustrated in FIG. 4 which shows a rotary furnace 35 which is tiltable to the horizontal about a pivot as shown, the furnace being supported circumferentially by a vessel support frame 36, the furnace having a pair of circumferential riding rings or tracks 37 and 38 intergral therewith around substantially its middle region, the rings or tracks riding on motor driven support rollers 39 and 40 to permit rotation of the furnace about its longitudinal axis. A removable bottom 41 closes one end to permit access to the interior of the furnace for rebuilding the lining thereof when necessary.

The forward or open end 42 of the furnace communicates with an exhaust hood 43 by means of an exhaust hood ring 44. The rotary furnace is provided with thrust rolls 45 as shown.

The chamber of the furnace is lined with fire brick 46 around the side walls and at the bottom thereof such that, in the tilted condition, the furnace provides optimum balance between the degree of fill and agitation.

A water-cooled burner 47 passes through the exhaust hood as shown and enters the mouth of the furnace substantially along the axis of rotation of the furnace to provide a flame to heat up the furnace and provide a molten charge 48. The burner is preferably the concentric tube type with the oxygen fed centrally of the tube at 46A and the hydrocarbon fuel fed through the annulus between the central tube and a first outer tube at 46B. A second outer tube surrounds said first outer tube for circulating water therethrough via inlet and outlet ports 49 and 50, respectively. Such burners are common in the art.

The calcine for the rotary furnace is the same as that described hereinbefore. The calcine containing less than 1% sulfur is mixed with particulate carbonaceous reducing agent together with slag-forming constituents added to the charge, the overall slag composition taking into account the iron oxide present in the calcine and the residual gangue. As stated herein, the slag is substantially a ferro-silicate slag with the total Fe to $SiO_2$ ratio ranging from about 1.2:1 to 4:1, more preferably, 1.25:1 to 2.3:1. Lime may be optionally employed in amounts ranging up to about 15% by weight of the slag of the forgoing type.

The carbonaceous reducing agent is preferably metallurgical coke falling within a size range of about 20 to 150 mesh, the amount of the carbonaceous reducing agent ranging from about 4 to 10% by weight of the calcine, and preferably, about 4 to 8%, depending upon the oxygen-fuel ratio used. The amount of coke used per unit weight of calcine is generally less in the rotary furnace as compared to the amount used in the aforementioned shallow bed reactor of FIG. 3. Preferably, excess oxygen is used in combusting the fuel, the excess oxygen not exceeding about 10% by volume, e.g. 3 to 10% excess, more preferably, about 3 to 6% oxygen by volume for coke additions ranging from about 4 to 8% by weight.

The foregoing charge is smelted while the furnace is rotating by injecting a combusting stream of oxygen and hydrocarbon fuel axially into the furnace from one end thereof, the ratio of the oxygen to the hydrocarbon fuel on the weight basis being in the neighborhood of at least about 3:1 plus up to about 10% excess, the ratio, as indicated above, being substantially directly correlated to the carbonaceous reducing agent (4 to 10%) in the charge; that is, the lower the oxygen-fuel ratio, the lower is the amount of reducing agent over the foregoing range; and similarly, the higher the oxygen-fuel ratio, the higher the amount of reducing agent in the charge over said range. The object in burning the fuel with excess oxygen in an amount up to 10% excess by volume is to provide an atmosphere conducive to maintaining the iron substantially in the ferrous oxide state and to provide a fluid slag in combination with $SiO_2$ and assure low-iron blister copper.

Following preparation of the charge, the charge is smelted for a time sufficient to provide blister copper low in iron. By cascading the charge during smelting, the effects of a shallow bed are achieved, whereby the charge is rapidly smelted, the molten blister copper being immediately separated from the slag following completion of reduction. The residence time in the rotary furnace is generally less than one hour.

The oxygen-fuel ratio, e.g. oxygen-fuel oil, necessary for substantially complete combustion, is well known to those skilled in the art and is available in the handbooks. Thus, for No. 2 fuel oil, the ratio is given at 286 $ft^3$ $O_2$/gal. of No. 2 fuel oil, and for Bunker C at 300 $ft^3$ $O_2$/gal. of Bunker C fuel oil. The foregoing ratios correspond by weight to about 3.6:1 and 3.7:1, respectively, of oxygen to fuel. The ratio should be at least about 3:1 with excess oxygen employed not exceeding 10% of that required for substantially complete combustion. The smelting temperature ranges from about 1250° C to 1400° C, e.g., 1250° C to 1350° C.

DETAIL ASPECTS OF SMELTING IN THE ROTARY FURNACE

As illustrative of a preferred embodiment of the invention, a copper-iron sulfide concentrate containing 31.9% Cu, 25.4% Fe, 34.7% S, 6.1% $SiO_2$, 1.4% $Al_2O_3$ and the balance residuals making up 100% is roasted at about 880° C for a time sufficient to provide a calcine containing less than 1% S and convert the iron to ferric iron oxide as evidenced by the presence of substantial amounts of copper ferrite.

Several batches of the calcine were mixed with varying amounts of metallurgical coke and sufficient sand and optionally limestone based on the foregoing analysis of the concentrate to provide a slag composition having a melting point below 1250° C as described hereinbefore. The rotary furnace is preheated to temperature before smelting.

Each batch for the rotary furnace approximated about 300 to 600 lbs. The charges were in the furnace for a total residence time of about one hour, the charge being cascaded at a rotational speed of 0.5 rpm. The results obtained are given in the following table:

TABLE 3

| Test No. | Fluxes % Sand | Fluxes % CaO | Coke % | Excess O$_2$% | Cu Blister % Cu | Cu Blister % Fe | Slag % Cu | Slag % Total Fe | Slag SiO$_2$ | Cu Distribution Cu | Cu Distribution Slag |
|---|---|---|---|---|---|---|---|---|---|---|---|
| 6 | 5 | 0 | 5.0 | 5.0 | 99.6 | 0.01 | 8.0 | 37.5 | 22.1 | 88.3 | 11.7 |
| 7 | 10 | 0 | 7.5 | 5.0 | 98.8 | 0.005 | 8.76 | 39.9 | 27.3 | 84.6 | 15.4 |
| 8 | 10 | 10 | 5.0 | 5.0 | 98.6 | 0.01 | 5.3 | 38.2 | 27.9 | 89.2 | 10.8 |
| 9 | 10 | 15 | 5.0 | 10.0 | 98.8 | 0.02 | 3.48 | 35.9 | 27.8 | 94.6 | 5.4 |
| 10 | 10 | 15 | 5.0 | 5.0 | 98.6 | 0.005 | 2.8 | 34.4 | 29.0 | 95.0 | 5.0 |
| 11 | 10 | 15 | 7.5 | 10.0 | 98.4 | 0.22 | 3.9 | 34.5 | 27.8 | 93.6 | 6.4 |
| 12 | 10 | 15 | 10.0 | 10.0 | 97.8 | 0.56 | 1.4 | 35.7 | 27.6 | 97.2 | 2.8 |
| A | 10 | 0 | 3.5 | 15.0 | 99.4 | 0.11 | 18.0 | 25.5 | 22.9 | 52.0 | 48.0 |
| B | 10 | 15 | 5.0 | 20.0 | 98.8 | 0.01 | 5.18 | 34.4 | 26.0 | 89.3 | 10.7 |
| C | 10 | 15 | 5.0 | 30.0 | 98.9 | 0.01 | 8.9 | 32.2 | 25.3 | 80.5 | 19.5 |
| D | 5 | 0 | 3.0 | 2.5 | 99.6 | 0.015 | 14.5 | 36.3 | 22.5 | 76.3 | 23.7 |

As will be noted, the use of a shallow bed of the cascading type produces a blister copper with very low iron content. As will also be noted, the relationship of coke in the charge to excess oxygen in the oxygen-fuel mixture is apparently important.

Referring to Tests A to C, if the amount of excess oxygen is too high, e.g. 15 to 30%, when related to the coke in the charge, e.g. 3.5 to 5% by weight, the loss of copper in the slag is fairly high. In Test A, 48% of the copper was taken up by the slag. In Test D, in which both the coke and excess oxygen were low, about 23.7% of the copper went into the slag, apparently due to incomplete reduction of the copper oxide.

In Tests 6 to 12, the blister copper generally assayed over about 98% copper by weight. The results of these tests (6 to 12) confirm that for consistent results the coke or carbonaceous material in the charge should range from about 4% to 10% by weight correlated to excess oxygen mixed with the hydrocarbon fuel ranging from about 3 to 10% excess oxygen, the excess oxygen being defined as that in excess of the amount required to promote substantially complete combustion. Preferably, the coke or carbonaceous material should range from about 4 to 8% by weight and the excess oxygen from about 3 to 6% in order to assure optimum recovery of copper, approximately 5% by weight of coke being particularly preferred. Similar results are obtainable using methane as the hydrocarbon fuel.

The slags obtained in Tests 6 to 12 when averaged together exhibited a total iron to SiO$_2$ ratio of approximately 1.4:1, the ratios ranging from about 1.2:1 to 1.7:1.

Figure 5:
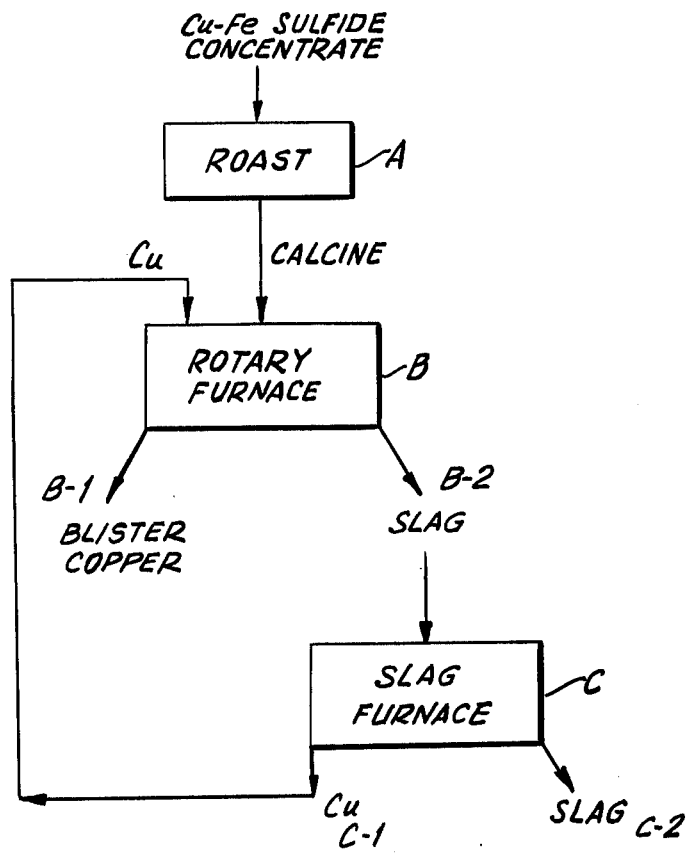
FIG. 5 is a flow sheet depicting one embodiment of a method using the smelting furnace as shown in FIG. 4 for smelting roasted copper-iron concentrate or calcine.

As stated hereinbefore for the shallow bed reactor, the copper yield can be increased by treating the slag in an electric slag cleaning furnace in which the copper in the slag is reduced and recovered in a copper which is recycled to the rotary furnace with fresh calcine. A typical flow sheet is shown in FIG. 5 which depicts a copper-iron sulfide concentrate which is subjected to a roasting treatment A to produce a calcine which is fed to rotary furnace B where an appropriate charge is produced as described hereinbefore. It is preferred that the calcine be fed hot to the rotary furnace (conserve heat from the roaster) where the charge is smelted to produce blister copper B-1 and slag B-2, the slag being discharged and transferred to slag cleaning furnace C where the retained copper therein is reduced and recovered as a black copper product C-1 which is recycled to the rotary furnace as shown, the slag C-2 substantially clean of copper being discharged to dump.

The blister copper produced in rotary furnace B may be treated in several ways. For example, after the slag has been poured off by tilting the furnace about its transverse axis, the copper in the vessel may be further fire refined using conventional techniques to produce anode-grade copper which is cast into anodes for electrolytic refining.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of producing blister copper from copper-iron sulfide concentrate containing by weight about 15 to 45% Cu, about 15 to 40% Fe, about 20 to 45% S, the total Cu, Fe and S content being at least about 85% and the balance gangue and residual metals which comprises, dead roasting said sulfide concentrate at a temperature above 800° C to remove sulfur therefrom and form ferric iron oxide as evidenced by the formation of substantial amounts of magnetic copper ferrite, forming a batch mixture of said roasted concentrate together with a slagging agent comprising SiO$_2$, the amount of SiO$_2$ present being sufficient to combine with FeO reduced from said ferric iron oxide and provide a slag having a melting point below about 1250° C, forming agglomerates from said batch mixture, charging said agglomerates into a shallow bed reactor furnace together with an amount of carbonaceous material correlated to reduce copper oxide therein and ferric iron oxide to FeO and provide sufficient heat to effect smelting in said furnace, said charge forming a shallow bed disposed above a tuyere line located peripherally around said furnace, said shallow bed charge ranging up to about 6 feet in height, igniting said carbonaceous material in said shallow bed and blasting air through said bed via said tuyeres, thereby heating and rapidly smelting said batch by raising the temperature thereof in excess of the melting point of copper, said charge being maintained in said furnace for a residence time of less than about 1 hour sufficient to reduce said copper oxide selectively to molten blister copper and reduce ferric iron oxide to ferrous oxide to combine with the SiO$_2$ present to form a molten slag, and allowing said molten copper and said molten slag to settle by gravity in said furnace into a confining hearth located at the bottom of said furnace to produce a pool of blister copper with a layer of said molten slag on the top thereof.

2. The method of claim 1, wherein the amount of carbonaceous material ranges from about 12% to 18% by weight of said agglomerates.

3. The method of claim 1, wherein the rate of smelting is such that the slag formed contains ferric iron ranging up to about 20% by weight of the slag.

4. The method of claim 1, wherein the sulfide concentrate is dead roasted to remove the sulfur to a level not exceeding about 1% by weight.

5. The method of claim 1, wherein the sulfide material is dead roasted at a temperature ranging from about 850° C to 950° C and the dead roasted concentrate is smelted at a temperature ranging from about 1250° C to 1400° C.

6. The method of claim 1, wherein the slag has an $Fe/SiO_2$ ratio of about 1.2:1 to 4:1.

7. The method of claim 1, wherein the slag containing residual copper is treated to recover a copper product therefrom which is recycled to said smelting furnace.

8. The method of claim 1, wherein the slag contains residual copper, wherein said copper is substantially recovered as black copper by smelting a charge of said slag in an electric furnace with a carbonaceous reducing agent, and wherein the black copper formed is recycled to said shallow bed reactor furnace.

9. A method of producing blister copper from copper-iron sulfide concentrate which comprises, providing said sulfide concentrate as a dead roasted concentrate in which iron is present as ferric oxide as evidenced by the presence of substantial amounts of magnetic copper ferrite, forming a batch mixture of said roasted concentrate together with a slagging agent comprising $SiO_2$, the amount of $SiO_2$ present being sufficient to combine with FeO reduced from said ferric iron oxide and provide a slag having a melting point below about 1250° C, forming agglomerates from said batch mixture, charging said agglomerates into a shallow bed reactor furnace together with an amount of carbonaceous material correlated to reduce copper oxide therein and ferric iron oxide to FeO and provide sufficient heat to effect smelting in said furnace, said charge forming a shallow bed disposed above a tuyere line located peripherally around said furnace, said shallow bed charge ranging up to about 6 feet in height, igniting said carbonaceous material in said shallow bed and blasting air through said bed via said tuyeres, thereby heating and rapidly smelting said batch by raising the temperature thereof in excess of the melting point of copper, and smelting said charge in said furnace at a residence time of less than about 1 hour sufficient to reduce said copper oxide selectively to molten blister copper and reduce ferric iron oxide substantially to ferrous oxide to combine with the $SiO_2$ present to form a molten slag.

* * * * *